US010372341B2

(12) United States Patent
Oshinsky et al.

(10) Patent No.: US 10,372,341 B2
(45) Date of Patent: Aug. 6, 2019

(54) NON-VOLATILE STORAGE DEVICE SYSTEM WITH PAGE BASED REMAPPING

(71) Applicant: Western Digital Technologies, Inc., San Jose, CA (US)

(72) Inventors: Hadas Oshinsky, Kfar Saba (IL); Rotem Sela, Hod Hasharon (IL); Amir Shaharabany, Kochav Yair (IL)

(73) Assignee: Western Digital Technologies, Inc., San Jose, CA (US)

( * ) Notice: Subject to any disclaimer, the term of this patent is extended or adjusted under 35 U.S.C. 154(b) by 125 days.

(21) Appl. No.: 15/636,496

(22) Filed: Jun. 28, 2017

(65) Prior Publication Data

US 2019/0004700 A1     Jan. 3, 2019

(51) Int. Cl.
*G06F 3/06*     (2006.01)
*G06F 12/02*    (2006.01)

(52) U.S. Cl.
CPC ............ *G06F 3/061* (2013.01); *G06F 3/0659* (2013.01); *G06F 3/0688* (2013.01); *G06F 12/0246* (2013.01); *G06F 2212/7201* (2013.01)

(58) Field of Classification Search
CPC ........ G06F 3/0616; G06F 3/061; G06F 3/064; G06F 3/0659; G06F 3/0667; G06F 3/0688; G06F 12/0246; G06F 12/1009; G06F 2212/65; G06F 2212/7201

USPC .......................................... 711/103, 203, 206
See application file for complete search history.

(56) References Cited

U.S. PATENT DOCUMENTS

| | | | |
|---|---|---|---|
| 10,157,007 B2* | 12/2018 | Byun | G06F 3/0619 |
| 2002/0080691 A1 | 6/2002 | Cho | |
| 2005/0021904 A1* | 1/2005 | Iaculo | G06F 12/0246 |
| | | | 711/103 |
| 2013/0124782 A1 | 5/2013 | Huang | |
| 2013/0268718 A1 | 10/2013 | Hall | |
| 2014/0215125 A1 | 7/2014 | Sela | |
| 2017/0139627 A1 | 5/2017 | Lee | |
| 2017/0242584 A1* | 8/2017 | Zhang | G06F 3/061 |
| 2017/0242626 A1* | 8/2017 | O'Krafka | G06F 3/064 |

* cited by examiner

*Primary Examiner* — Gary J Portka
(74) *Attorney, Agent, or Firm* — Vierra Magen Marcus LLP

(57) ABSTRACT

A controller addresses portions of non-volatile memory via a memory interface using physical addresses and addresses portions of host data via the host interface using logical addresses. The controller maintains logical to physical mappings and physical to logical mappings for the logical addresses and the physical addresses. The controller is configured to move data from a source logical address to a destination logical address by updating logical to physical mappings and physical address to logical mappings without instructing the non-volatile memory to move the data between physical locations. In one embodiment, this process is used to implement a command to move or defragment data.

19 Claims, 12 Drawing Sheets

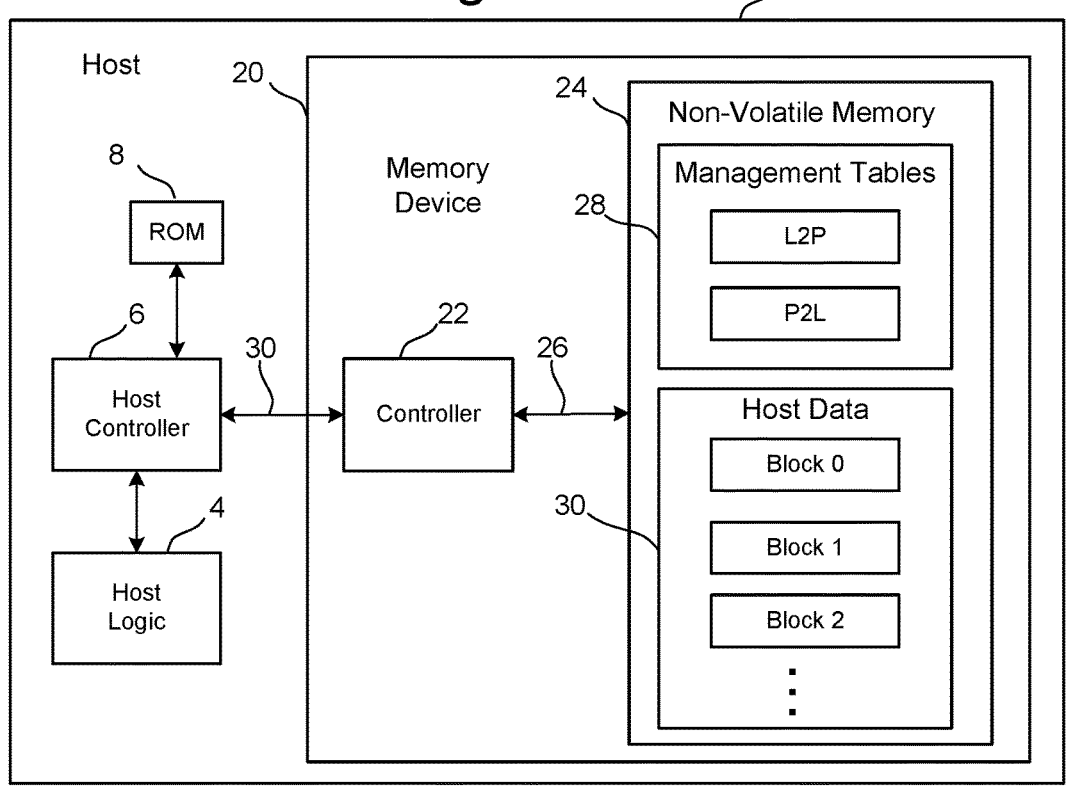
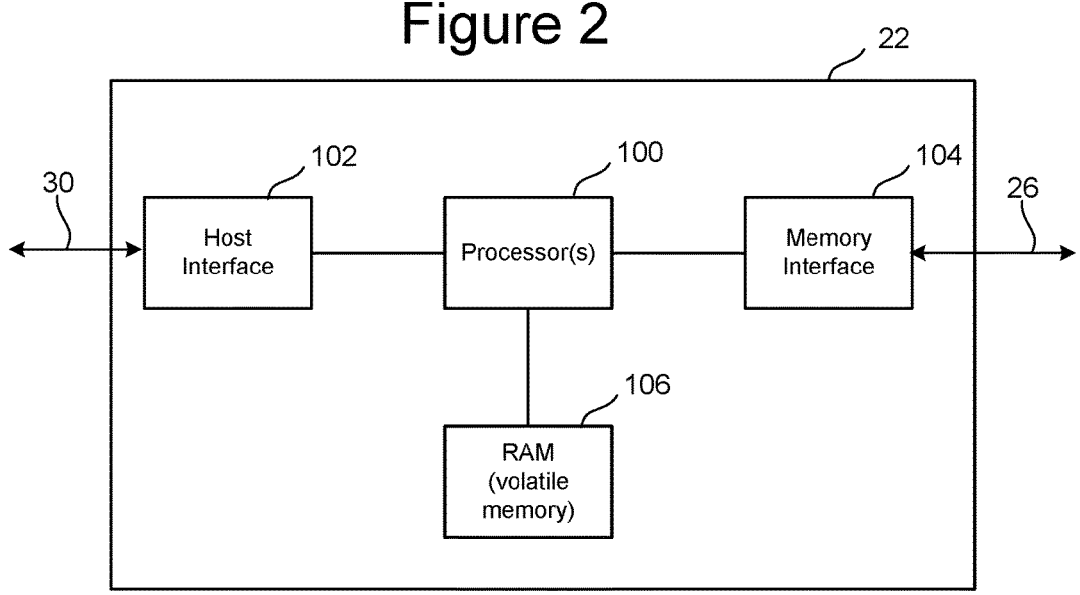

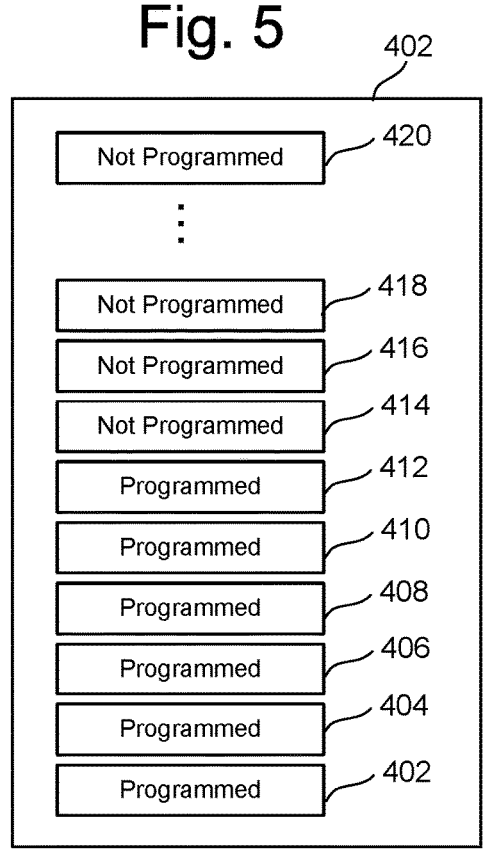
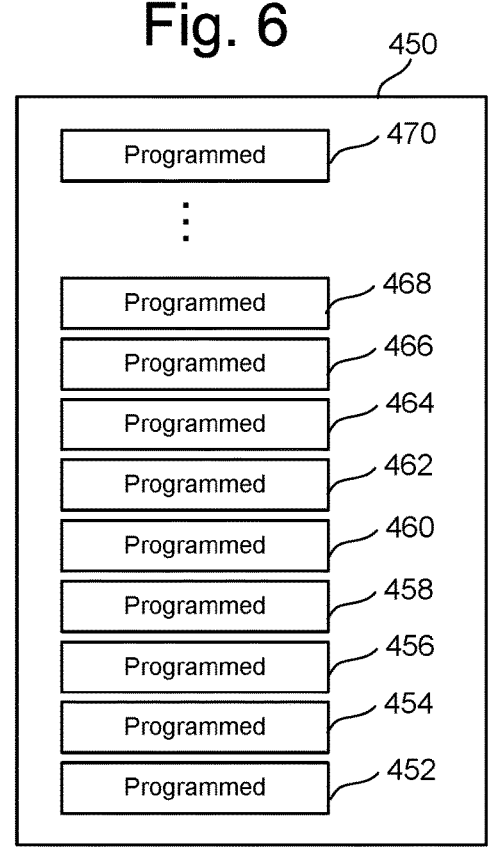
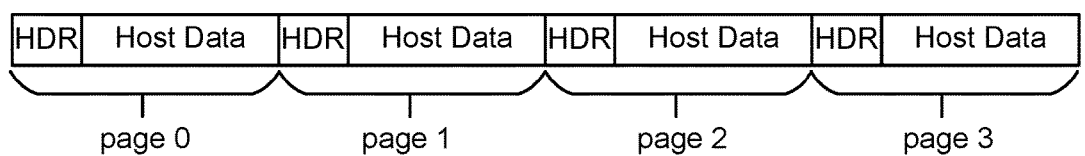
Fig. 7

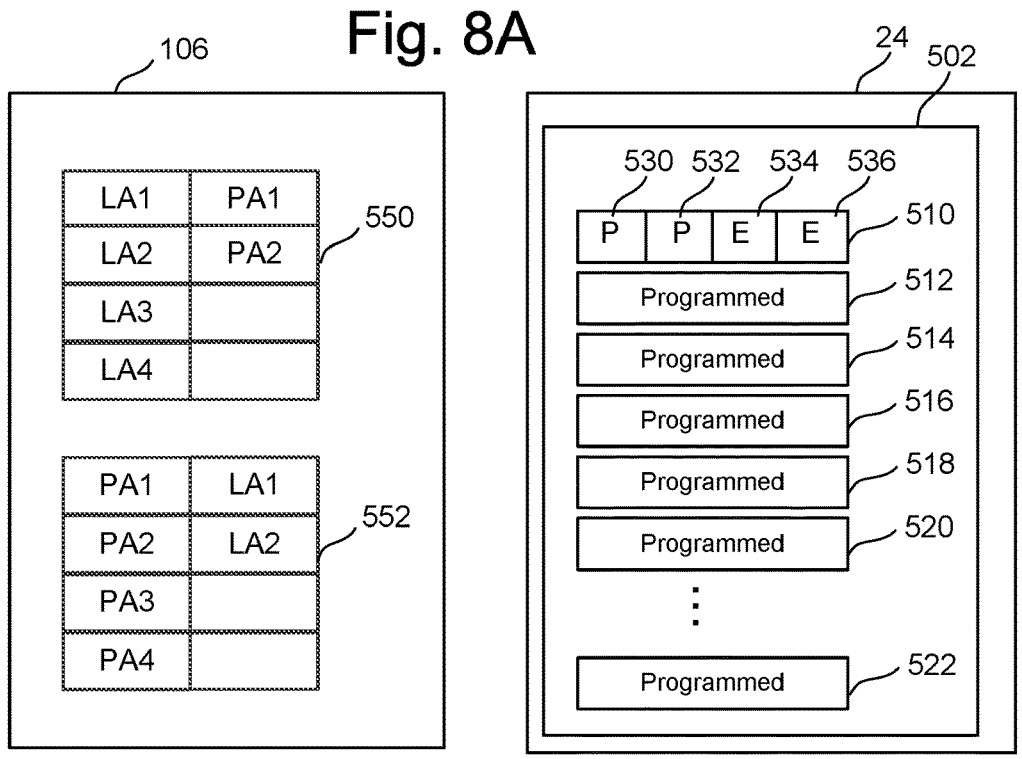
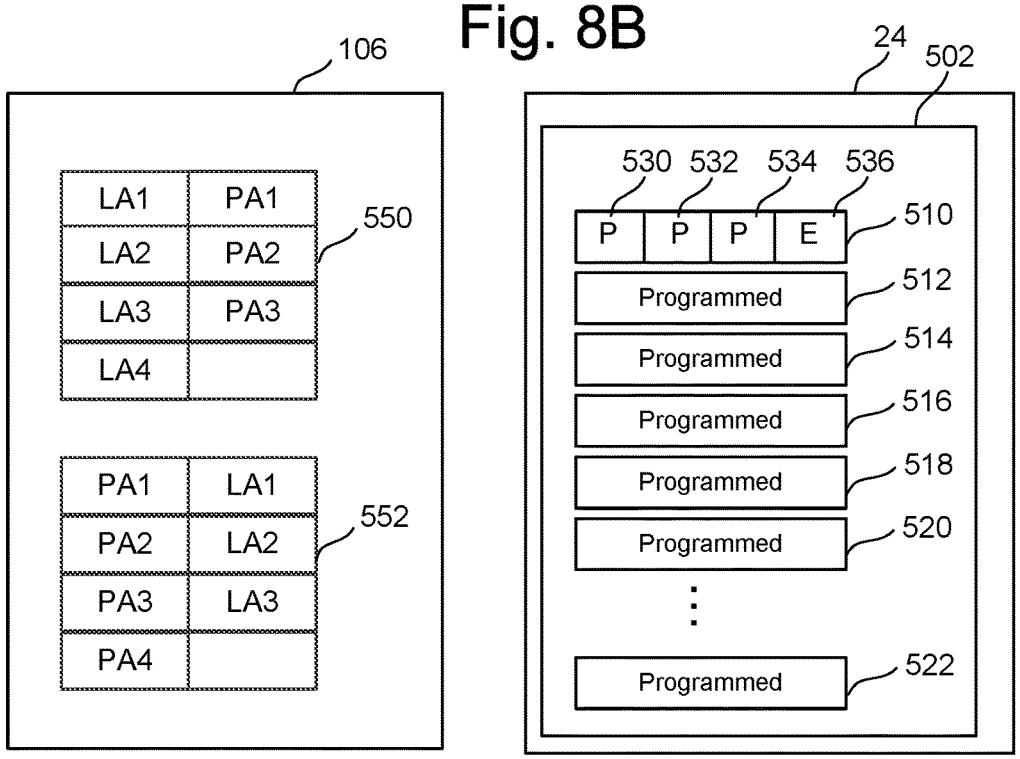

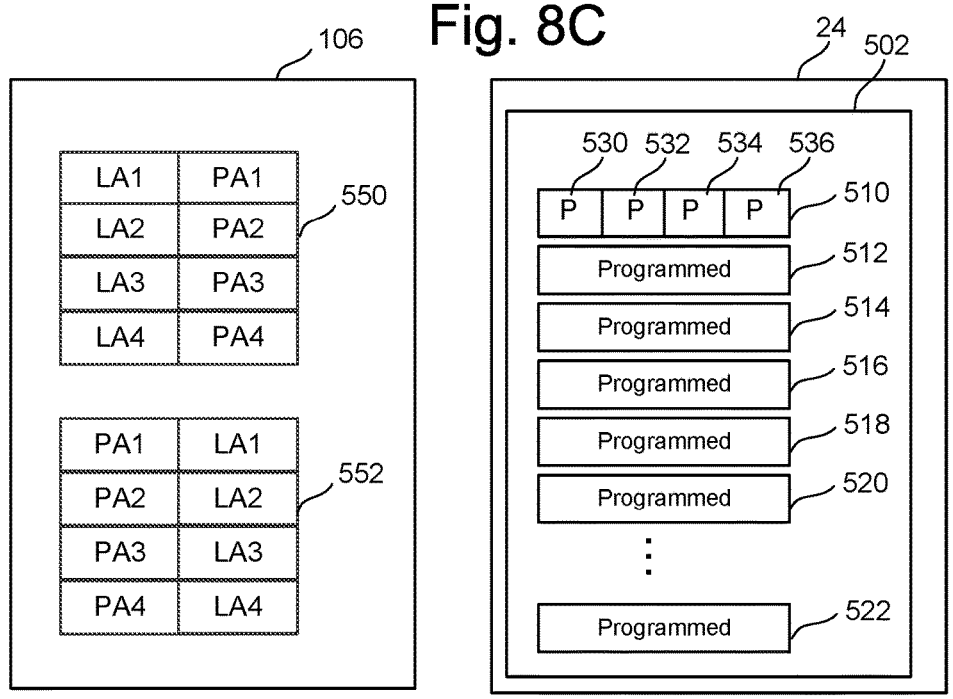
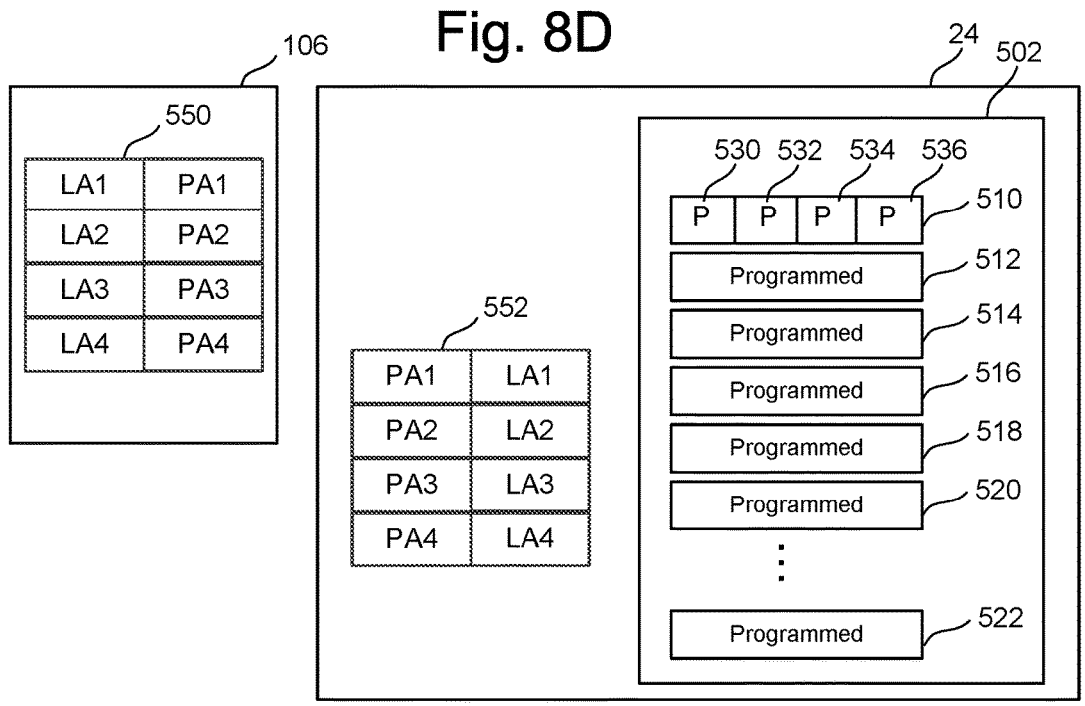

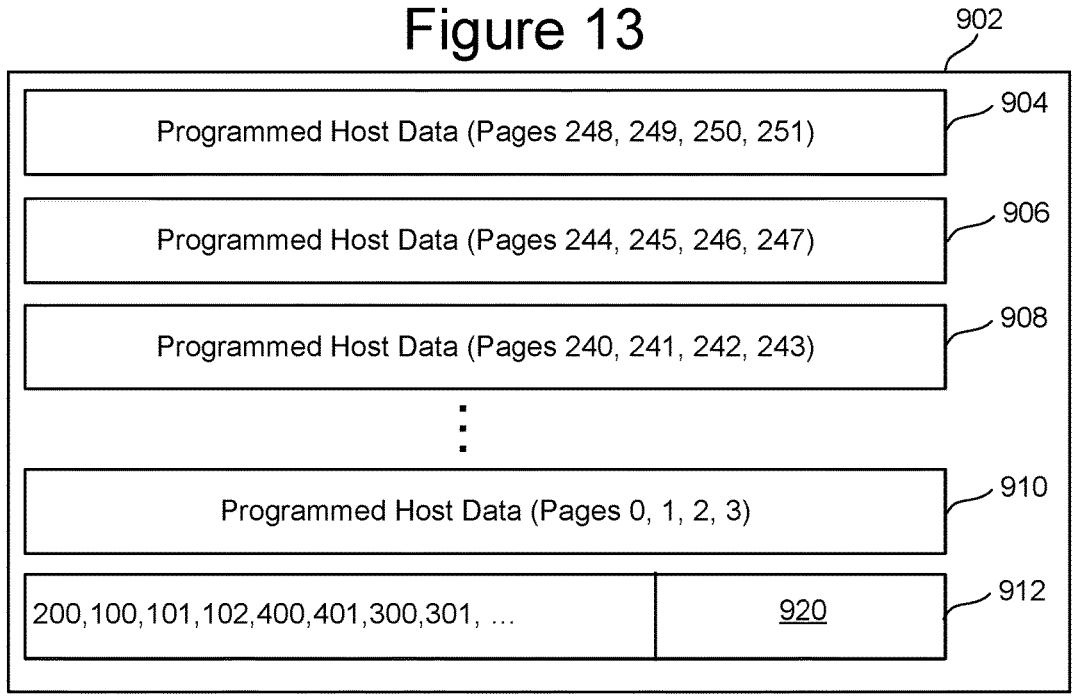
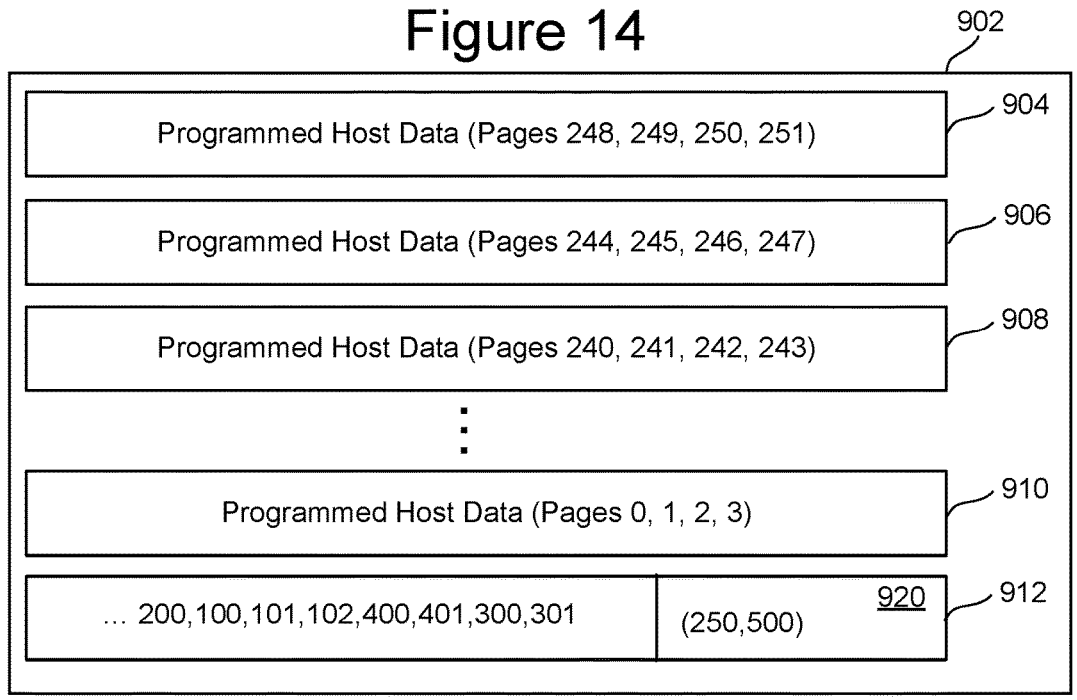

NON-VOLATILE STORAGE DEVICE SYSTEM WITH PAGE BASED REMAPPING

BACKGROUND

Many electronic apparatus make use of embedded memory devices. Often, the embedded memory devices includes non-volatile memory such as flash memory. An electronic apparatus that includes an embedded memory system, or is connected to a memory system, is often referred to as a host.

When writing data to a conventional flash memory system, a host typically writes data to, and reads data from, addresses within a logical address space of the memory system. The memory system then maps data between the logical address space and the physical blocks of the memory. The host keeps track of the logical addresses of its data files within the logical address space and the memory system may operate without knowledge of this mapping.

A drawback of memory systems that operate in a logical address space is fragmentation. Data written by a host file system may often be fragmented in logical address space because updates to files require the new portions of the files to be rewritten to new logical addresses. Also, as logical memory locations are freed up and added back to the pool of available memory, some free portions may be too small to store files for the host.

When a memory device is sufficiently fragmented, performance may be degraded due to a shortage of large continuous chunks of free space in the memory to write new data. In order to improve performance, the host may need to perform defragmentation in which the host attempts to move data between logical address such that valid data resides in consecutive logical addresses, thereby freeing up large chunks of the memory system.

One scheme for performing defragmentation of a memory system is for the host to read back the data into its own internal RAM and then re-write the data into continuous logical addresses of the memory system. However, this is a slow process that also causes wear on the memory system and uses too much power.

BRIEF DESCRIPTION OF THE DRAWINGS

Like-numbered elements refer to common components in the different figures.

FIG. 1 is a block diagram of a memory device embedded in, and/or connected to, a host device.

FIG. 2 is a block diagram one embodiment of a controller.

FIG. 5 depicts an open block of memory cells.

FIG. 6 depicts a closed block of memory cells.

FIG. 7 depicts data stored in memory cells connected to a common word line.

FIGS. 8A-D depict logical to physical mappings, physical to logical mappings and a block of host data.

FIG. 13 is a block diagram depicting an example block of host data stored in non-volatile storage.

FIG. 14 is a block diagram depicting an example block of host data stored in non-volatile storage.

DETAILED DESCRIPTION

Figure 3:
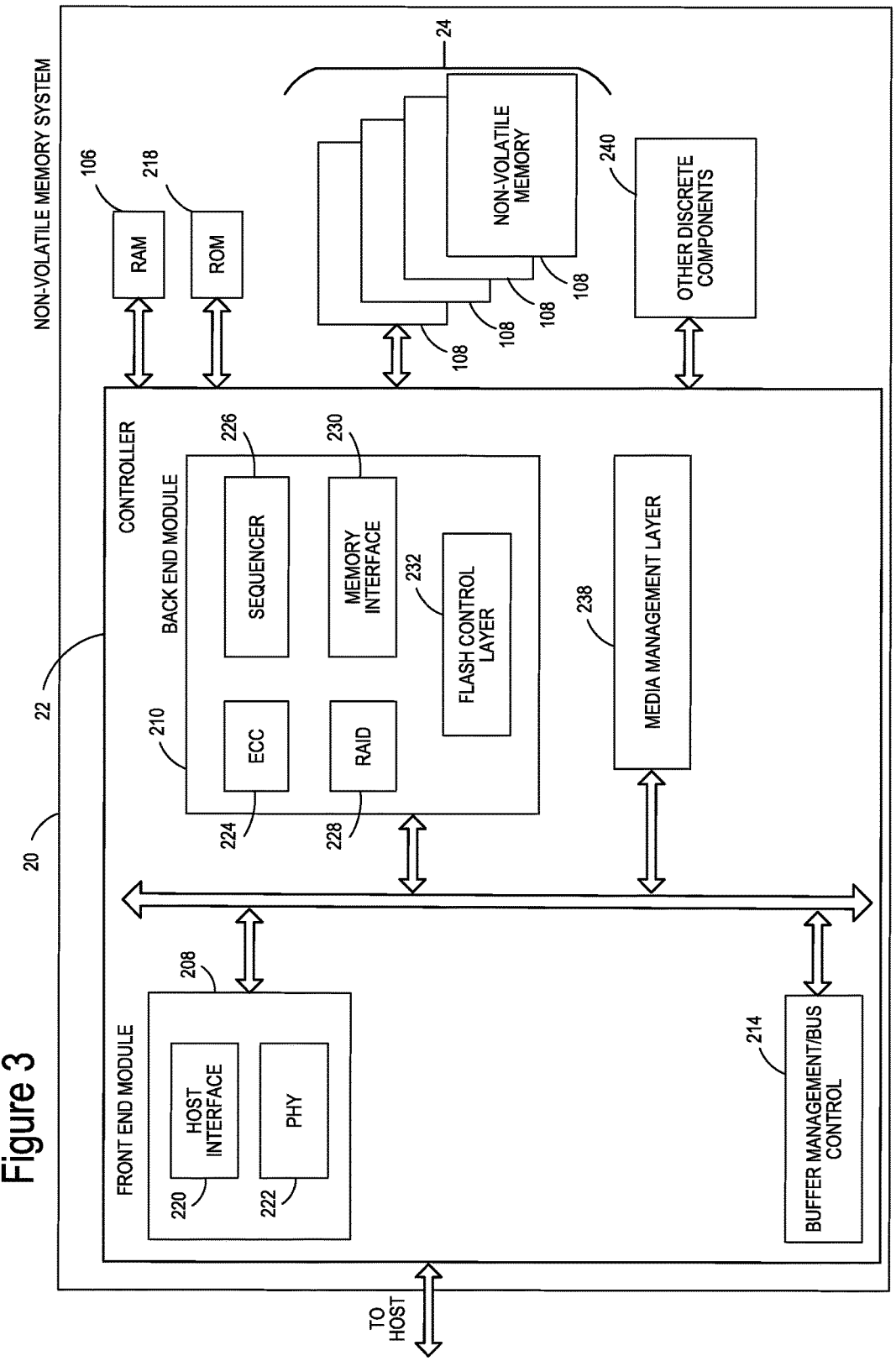
FIG. 3 is a block diagram of one example of a memory device.

One approach to performing defragmentation of a memory system is for the host to issue a defragmentation or move command. For example, the host can issue a command to move data from a set of one or more source logical addresses to a set of one or more destination logical addresses. In response to such a command, the memory system can copy the data from the source logical addresses to the destination logical addresses by reading the data from the source logical addresses, copying that data to RAM internal to the memory system and subsequently copying the data from the RAM to the flash memory at the destination logical addresses. This will remove the need for the host to read the data into the host's internal RAM and write it back, thereby, saving time and host resources. However, it is still an expensive approach as it the same workload from the memory system's perspective, including reading from the source flash memory cells, writing the data to the destination flash memory cells and updating mapping tables. Thus, the move/defragmentation process would still be a slow process that also causes wear on the flash memory system and uses too much power.

Therefore, it is proposed that the memory system respond to a defragmentation or move command by updating management tables without moving data in the physical memory (i.e. without moving data between memory cells). This will lead to faster performance, less wear on the memory and use of less power. For example, one embodiment of the proposed memory system includes a plurality of non-volatile memory cells (e.g., such as flash memory) and means for moving host data from a source logical address to a destination logical address without moving the host data between memory cells by updating a logical to physical mapping and updating a physical to logical mapping that is stored in the memory cells separate from the host data.

One embodiment of the proposed solution implements page based flash management, which relies on two sets of management tables: logical to physical mappings and physical to logical mappings. Logical to physical mappings (also referred to as a logical to physical table or L2P table) indicate translations from logical addresses in a logical address space to physical addresses of the memory cells. That is, this mapping holds for each host logical address what is the physical location in the flash memory (or other non-volatile memory structure). For entries in logical to physical mappings, the logical addresses do not change while the physical addresses can change. The physical to logical mappings (also referred to as a physical to logical table or P2L table) indicate for a given physical address in the memory what logical address has its data stored in that physical address. That is, for each physical location (or a subset) in the flash memory (or other non-volatile memory structure), the mapping indicates what logical address is associated with the data being stored. For entries in the physical to logical mapping, the physical addresses do not change while the logical addresses can change. In other words, a P2L table maintains the logical address corresponding to a physical address (i.e. page, block, etc.) in the non-volatile memory; the inverse of the L2P table. For the P2L table, the physical address is the index to the table and does not change, while the corresponding entry for each physical address includes the logical address field, which can change. More details are provided below.

The P2L table is often used for garbage collection process. When a memory device wants to perform garbage collection for certain memory blocks (i.e. copy the block's valid data to a new block in order to invalidate stale data and release the block), the memory device needs to know which logical addresses are to be copied. This is required in order to update the L2P tables. If the memory device doesn't maintain the P2L table, it needs to scan all L2P tables in order to know which logical addresses are within the source block. This operation is very costly with respect to time.

Typically, the memory device will maintain the L2P tables in its management tables stored in dedicated flash memory blocks. The P2L mapping is typically kept within the header of each minimal write unit, such as a page of data which can be 2 KB, 4 KB or other amount. Due to the fact that P2L tables are maintained within the host data, as part of the page of data, it is difficult to update the P2L table as it would require a complete re-write of the host data.

To more efficiently support a move operation that comprises remapping (as discussed herein), a memory device can maintain its P2L tables separately from the host data. The challenge with this approach is that keeping such P2L tables separately in flash memory still requires overhead when the table needs to be updated. Therefore, it is proposed that the new P2L tables contain the physical to logical mapping of each block and will be written once when a physical block is closed. Typically, the flash management will keep a few blocks open (e.g., block is not filled up with data and available to receive additional data). For each such open block the device will keep the P2L table(s) of this block in its internal RAM (volatile local memory). During the block's writing, the memory device will update this structure in RAM. When the block is closed (i.e. the block is fully written), the memory device will write this P2L table to the flash memory.

FIG. 1 is a block diagram depicting one embodiment of a memory device 20 embedded in a host device 2 (or connected to host device 2) that implements the technology described herein for moving host data from a source logical address to a destination logical address without moving the host data between memory cells. Host device 2 includes host logic 4 for performing the intended functions of host 2. For example, host 2 can be a smartphone, PDA, laptop, server, set top box or other electronic device. Host logic 4 performs the functions of a smartphone, PDA, laptop, server, set top box, etc. Host logic 4 is connected to host controller 6 for communicating with memory device 20 via host interface signals 30. Host controller 6 is also in communication with ROM 8.

Memory device 20 includes controller 22 in communication with non-volatile memory 24 via signals 26. Note that FIG. 1 shows a logical depiction of non-volatile memory 24. In one embodiment, non-volatile 24 can be implemented using one or multiple memory die. Non-volatile memory 24 includes management tables 28 and host data 30. In one embodiment, management tables 28 includes L2P tables (logical to physical mappings) and P2L tables (physical to logical mappings). In one embodiment, the host data 20 is stored in blocks (e.g., Block 0, Block 1, Block 2, . . . ). In some example embodiments, a block of non-volatile memory cells is the unit of erase. In some embodiments, a block represents a plurality of memory cells grouped by common bit lines and word lines.

When host device 2 performs a defragmentation of the host data 30 in non-volatile memory 24, host device sends a command to move host data from a source logical address to a destination logical address, or to move host data from multiple source logical addresses to multiple destination logical addresses. In response to a command to move host data, controller 22 updates logical to physical mappings (L2P tables) and updates one or more physical to logical mappings (P2L tables) as described below, with the P2L tables being stored separately from the data as depicted in FIG. 1.

FIG. 2 is a block diagram of one example embodiment of the hardware architecture for controller 22 that implements the technology described herein for moving host data from a source logical address to a destination logical address without moving the host data between memory cells. Controller 22 includes one or more processors 100 in communication with a host interface 102 and a memory interface 104. Host interface 102 communicates with host device 2 via host interface signals 30. In one embodiment, host interface 102 is a Multi Media Card (MMC) interface. In another embodiment, host interface 102 is a Universal Flash Storage (UFS) interface. Memory interface 104 communicates with non-volatile memory 24 via signals 26 and can be any suitable interface including Toggle Mode 200, 400 or 800. Processors 100 are also in communication with RAM 106, which is a local volatile memory for controller 22. RAM 106 can be any type of volatile storage (e.g., DRAM, SRAM, etc.). In one embodiment, RAM 106 stores code (software and/or firmware) that programs one or more processors 100 to perform the functions described below for moving host data from a source logical address to a destination logical address without moving the host data between memory cells. In another embodiment, one or more processors 100 include custom hardware (FPGAs, ASICS, etc.), with or without software, to perform the functions described below for moving host data from a source logical address to a destination logical address without moving the host data between memory cells.

FIG. 3 is a block diagram of one example embodiment of memory device 20. However, the architecture depicted in FIG. 3 can also be used to implement other types of non-volatile storage devices. FIG. 3 shows that memory device 20 includes controller 22 connected to one or more non-volatile memory die 108 (which comprise the non-volatile memory 24 depicted in FIG. 1). FIG. 3 provides details of some of the software components of controller 22, which will be discussed in more detail below.

As used herein, for a system that uses non-volatile memory, a controller is a device that manages data stored on the non-volatile memory and communicates with a host. Controller 22 can have various functionality in addition to the specific functionality described herein. For example, controller 22 can format the non-volatile memory to ensure the memory is operating properly, map out bad memory cells (the physical unit of storage), and allocate spare memory cells to be substituted for future failed cells. Some part of the spare memory cells can be used to hold firmware to operate the controller and implement other features. That firmware can also be read into local volatile memory during operation. When a host needs to read data from or write data to the non-volatile memory, it will communicate with controller 22. If the host provides a logical address to which data is to be read/written, controller 22 converts the logical address received from the host to a physical address in the physical flash memory. Alternatively, the host can provide the physical address. Controller 22 can also perform various memory management functions, such as, but not limited to, wear leveling (distributing write operations among memory die or blocks of the memory to avoid wearing out specific blocks of memory that would otherwise be repeatedly written to) and garbage collection (after a block is full, moving only the valid pages of data to a new block, so the full block can be erased and reused).

The interface between controller 22 and non-volatile memory die 108 may be any suitable flash interface, such as Toggle Mode 200, 400, or 800. In some embodiments, memory device 20 includes a single channel between controller 22 and non-volatile memory die 108; however, the subject matter described herein is not limited to having a single memory channel. For example, in some memory system architectures 2, 4, 8 or more channels may exist between controller 12 and memory die 108, depending on controller capabilities. In any of the embodiments described herein, more than a single channel may exist between controller 22 and memory die 108, even if a single channel is shown in the drawings.

As depicted in FIG. 3, controller 22 includes a front end module 208 that interfaces with a host, a back end module 210 that interfaces with the one or more non-volatile memory die 108, and various other modules that perform functions which will now be described.

The components of controller 22 depicted in FIG. 3 may take the form of a packaged functional hardware unit (e.g., an electrical circuit) designed for use with other components, program code (e.g., software or firmware) executable by one or more processors or processing circuitry that usually performs a particular function of related functions, or a self-contained hardware or software component that interfaces with a larger system. For example, each module may include an application specific integrated circuit (ASIC), a Field Programmable Gate Array (FPGA), an electrical circuit, a digital logic circuit, an analog circuit, a combination of discrete circuits, gates, or any other type of hardware or combination thereof. Alternatively or in addition, each module may include software stored in a processor readable device (e.g., local volatile memory) to program a processor to perform the functions described herein.

Memory device 20 includes random access memory (RAM) 106 (same local volatile memory as discussed above with respect to FIG. 2) and read only memory (ROM) 218. Referring again to modules of the controller 22, buffer manager/bus control 214 manages RAM 216 and controls the internal bus arbitration of controller 22. ROM 218 stores boot code for the controller. Although illustrated in FIG. 3 as located separately from the controller 22 (but connected to controller 22), in other embodiments one or both of the RAM 216 and ROM 218 may be located within the controller. In yet other embodiments, portions of RAM and ROM may be located both within the controller and outside the controller. Further, in some implementations, controller 22, RAM 216, and ROM 218 may be located on separate semiconductor die.

Front end module 208 includes a host interface 220 and a physical layer interface (PHY) 222 that provide the electrical interface with the host or next level storage controller. The choice of the type of host interface 220 can depend on the type of memory being used. Examples of host interfaces 220 include, but are not limited to, SATA, SATA Express, SAS, Fibre Channel, USB, PCIe, MMC, UFS and NVMe. The host interface 220 typically facilitates transfer for data, control signals, and timing signals. In one embodiment, front end module 208 provides the single communication interface adapted to communicate with an external computing device (e.g., host) for the controller 22 and memory die 108 of memory device 20.

Back end module 210 includes an error correction code (ECC) engine 224 that encodes the data bytes received from the host, and decodes and error corrects the data bytes read from non-volatile memory die 108. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the non-volatile memory system 100. In some cases, the RAID module 228 may be a part of the ECC engine 224. Note that the RAID parity may be added as an extra die or dies, but it may also be added within the existing die, e.g. as an extra plane, or extra block, or extra WLs within a block. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A flash control layer 232 controls the overall operation of back end module 210.

Additional components of memory device 20 illustrated in FIG. 3 include media management layer 238, which performs wear leveling of memory cells of non-volatile memory die 108. Memory system 20 also includes other discrete components 240, such as external electrical interfaces (e.g., as part of the host interface and the memory interface), external RAM, resistors, capacitors, or other components that may interface with controller 22. In alternative embodiments, one or more of the physical layer interface 222, RAID module 228, media management layer 238 and buffer management/bus controller 214 are optional components that are not necessary in the controller 22.

The Flash Translation Layer (FTL) or Media Management Layer (MML) 238 may be integrated as part of the flash management that may handle errors and interfacing with the host. In particular, MML 238 is responsible for the internals of non-volatile memory management. In particular, the MML 238 may include an algorithm in the memory device firmware which translates writes from the host into writes to the memory of a memory die 108. The MML 238 may be needed because: 1) the memory may have limited endurance; 2) the memory may only be written in multiples of pages; and/or 3) the memory may not be written unless it is erased as a block. MML 238 understands these potential limitations of the memory which may not be visible to the host. Accordingly, the MML 238 attempts to translate the writes from host into writes into the flash memory 126. MML 238 also manages the process for mapping between logical addresses from the host and physical addresses on the memory die 108. This includes updating the L2P tables and the P2L tables during programming, erasing and performing move commands (as discussed below).

Figure 4:
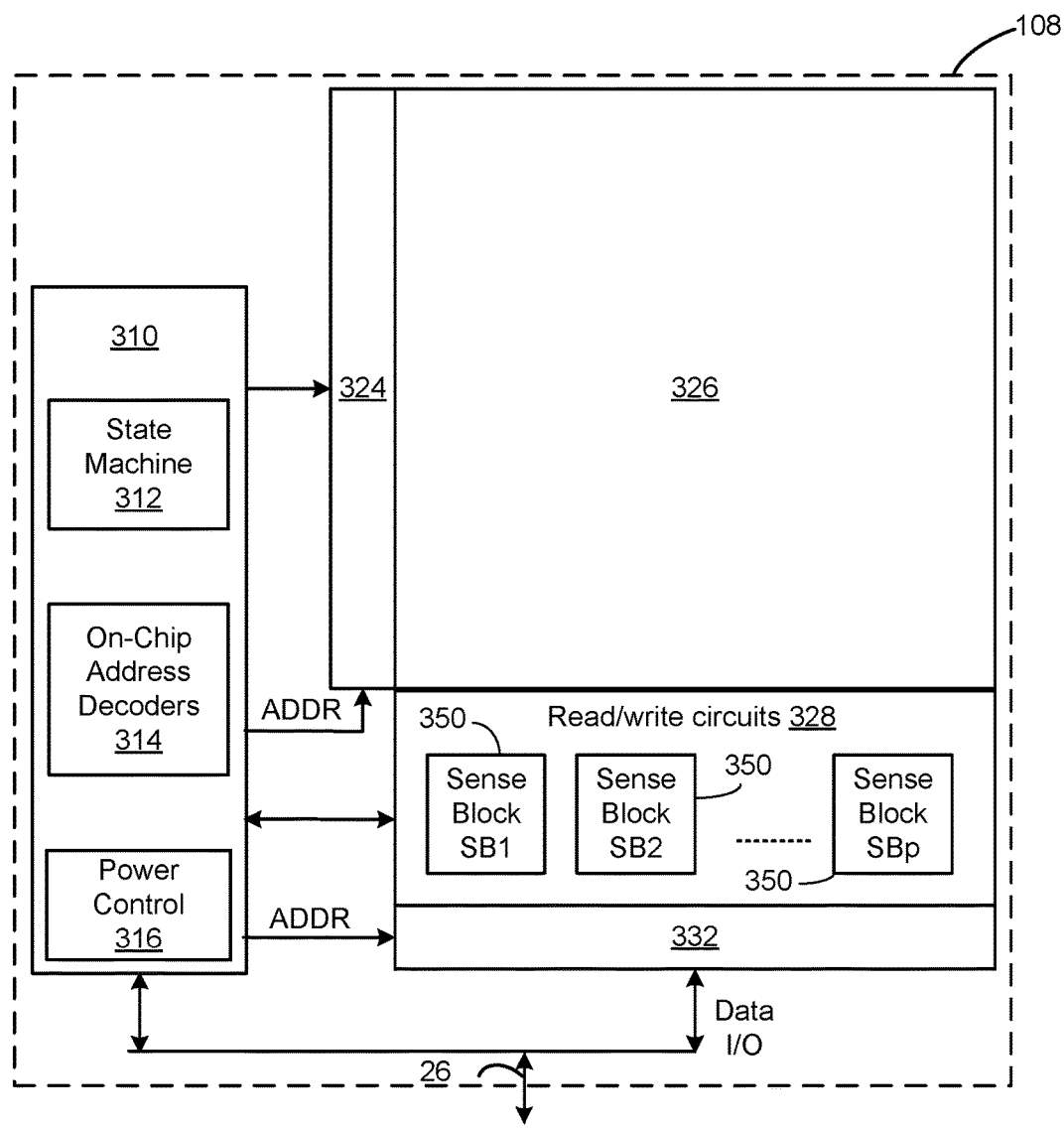
FIG. 4 is a block diagram of a non-volatile memory die.

FIG. 4 is a functional block diagram of an example memory die 108. The components depicted in FIG. 4 are electrical circuits. In one embodiment, memory die 108 includes a monolithic three dimensional memory structure 326 of non-volatile memory cells, control circuitry 310, and read/write circuits 328. In other embodiments, a two dimensional array of memory cells can be used. Memory structure 326 is addressable by word lines via a row decoder 324 and by bit lines via a column decoder 332. The read/write circuits 328 include multiple sense blocks 350 including SB1, SB2, . . . , SBp (sensing circuitry) and allow a page of memory cells to be read or programmed in parallel. Commands and data are transferred between controller 22 and memory die 108 via signal lines 26. In one embodiment, memory die 108 includes a set of input and/or output (I/O) pins that connect to lines 26.

One embodiment of memory structure 326 comprises a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. In one embodiment, memory structure 326 implements three dimensional NAND flash memory. One example of three dimensional NAND flash memory can be found in U.S. Patent Application 2016/0300619, incorporated herein by reference in its entirety. Other embodiments include two dimensional NAND flash memory, two dimensional NOR flash memory, ReRAM cross-point memory, magnetoresistive memory (e.g., MRAM), phase change memory (e.g., PCRAM), and others.

Control circuitry 310 cooperates with the read/write circuits 328 to perform memory operations (e.g., erase, program, read, and others) on memory structure 326, and includes a state machine 312, an on-chip address decoder 314, and a power control module 316. The state machine 312 provides die-level control of memory operations. In one embodiment, state machine 312 is programmable by software. In other embodiments, state machine 312 does not use software and is completely implemented in hardware (e.g., electrical circuits). In one embodiment, control circuitry 310 includes registers, ROM fuses and other storage devices for storing default values such as base voltages and other parameters. On-chip address decoder 314 provides an address interface between addresses used by host 340 or controller 22 to the hardware address used by the decoders 324 and 332. Power control module 316 controls the power and voltages supplied to the word lines and bit lines during memory operations. It can include drivers for word lines, selection transistors, source lines, and other components. Power control module 316 may include charge pumps for creating voltages. The sense blocks 350 include bit line drivers.

Any one or any combination of control circuitry 310, state machine 312, decoders 314/324/332, power control module 316, sense blocks 350, read/write circuits 328, and controller 22 can be considered one or more control circuits that performs the functions described herein.

Multiple memory elements in memory structure 326 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors that can be used within memory structure 326. A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

In one embodiment, a three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form vertical NAND strings that traverse across multiple horizontal memory device levels. Other three dimensional configurations can be envisioned wherein some NAND strings contain memory elements in a single memory level while other strings contain memory elements which span through multiple memory levels. One example memory system is a three dimensional memory structure that includes vertical NAND strings with charge-trapping material. Three dimensional memory arrays may also be designed in a NOR configuration.

Memory structure 326 can also be ReRAM cross point memory. One example of a ReRAM cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Memory structure 326 can also be Magnetoresistive memory (MRAM), which stores data by magnetic storage elements. In one example, the elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Memory structure 326 can also be phase change memory (PCRAM), which exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Memory structure 326 includes many blocks of memory cells. FIG. 5 depicts a block of memory cells 402 that includes a plurality of word lines. Each word line is connected to many memory cells. Depicted in block 402 are a set of word lines 402, 404, 406, 408, 410, 412, 414, 416, 418 and 420. Each word line is depicted as a rectangle, representing the memory cells connected to that word line. Inside each rectangle is an indication of whether the memory cells have been fully programmed (Programmed) or have not been fully programmed yet (Not Programmed). Memory cells connected to a common word line have been fully programmed when all of the memory cells have been programmed or purposefully kept in the erased state in order to store host data. As can be seen, word lines 402-412 have been fully programmed and word lines 416-420 have not been fully programmed. In one embodiment, an open block is a block that has word lines that have not been fully programmed. In another embodiment, an open block is a block for which the system intends to program more memory cells of that block.

FIG. 6 depicts block 450 having word lines 452, 454, 456, 458, 460, 462, 464, 466, 468 and 470. All of word lines 452-470 have been fully programmed (Programmed); therefore, block 450 is a closed block. In one embodiment, a closed block can also be a block for which the system does not intend to program any more memory cells of that block. Note that FIGS. 5 and 6 only show user data word lines.

FIG. 7 is a block diagram that describes the structure of the data stored in the memory cells connected to a common word line. For example, FIG. 7 describes the structure of how data is stored in any one of the word lines 402-420 of FIG. 5 and/or word lines 452-470 of FIG. 6. In one embodiment, the memory cells connected to a common word line store data in four pages: page 0, page 1, page 2, page 3 and page 4. Each page includes header information (HDR) and host data (Host Data). In one embodiment, each page includes 4K of host data that is encoded using an Error Correction Codes (ECC) according to any suitable ECC algorithm known in the art. In other embodiments, other sized pages can be used. Some systems store P2L tables in the header information, thus, locating the P2L tables within the host data. In some embodiments, the page is the unit of programming and reading. Therefore, in some embodiments, the L2P tables and the P2L tables will be page based, meaning that the L2P tables include logical to physical mappings for page addresses and the P2L tables include physical to logical mappings for page addresses. In other embodiments, the mappings can be for block addresses, word line addresses, or other units.

As discussed above, in one embodiment, the memory device will keep the P2L table(s) for open blocks in local volatile memory (e.g., RAM 106) rather than in the header information for the relevant page. During the block's programming, the memory device will update this structure in local volatile memory (e.g., RAM 106). When the block is closed, the memory device will write this P2L table to the non-volatile memory. This concept is illustrated by FIGS. 8A-D.

FIG. 8A depicts block of memory cells 502 in non-volatile memory 24. FIG. 8A only shows one block in non-volatile memory 24 for illustrative purposed; however, non-volatile memory 24 will have hundreds, thousands or millions of blocks. Block 502 is open because a portion of the block is not yet programmed. For example, word lines 512, 514, 516, 518, 520 and 522 have been fully programmed. Word line 510 has four pages: 530, 532, 534 and 536. Pages 530 and 532 have been programmed (P) while pages 534 and 536 have not been programmed; therefore, pages 534 and 536 are in the erased states (E). Because pages 534 and 536 have not been programmed, block 502 is an open block. Since, block 502 is an open block, FIG. 8A shows the P2L table 552 as being stored in local volatile memory (e.g., RAM 106). In one embodiment, L2P table 550 is also stored in local volatile memory (e.g., RAM 106) for an open block; however, in other embodiments L2P tables will only be stored in non-volatile memory 24 or L2P tables are stored in non-volatile memory 24 with a L2P cache storing a subset of L2P tables in local volatile memory (ie RAM 106). FIG. 8A only shows portions of L2P table 550 and P2L table 552 that pertain to word line 510.

Each page of word line 510 has a physical address. Page 530 has a physical address of PA1. Page 532 has a physical address of PA2. Page 534 has a physical address of PA3. Page 536 has a physical address of PA4. Each page of word line 510 has an entry in P2L table 552, thus, P2L table 552 has entries for physical addresses PA1, PA2, PA3 and PA4. Since pages 534 and 536 are unprogrammed, the entries in P2L table 552 for physical addresses PA3 and PA4 have no data for a mapped logical address. Alternatively, the entries in P2L table 552 for physical addresses PA3 and PA4 can store an indicator that the physical address is not programmed with valid data. Page 530 is programmed; therefore, the entry in P2L table 552 for physical addresses PA1 stores logical address LA1. Thus, physical addresses PA1 is mapped logical address LA1, meaning that the page in the non-volatile memory that is addressed by physical address PA1 is storing data addressed by the host by logical address LA1. Consequently, the entry in L2P table 550 for logical address LA1 is populated with physical address PA1. Page 532 is programmed; therefore, the entry in P2L table 552 for physical addresses PA2 stores logical address LA2. Thus, physical addresses PA2 is mapped to logical address LA2, meaning that the page in the non-volatile memory that is addressed by physical address PA2 is storing data addressed by the host by logical address LA2. Consequently, the entry in L2P table 550 for logical address LA2 is populated with physical address PA2.

Figure 9:
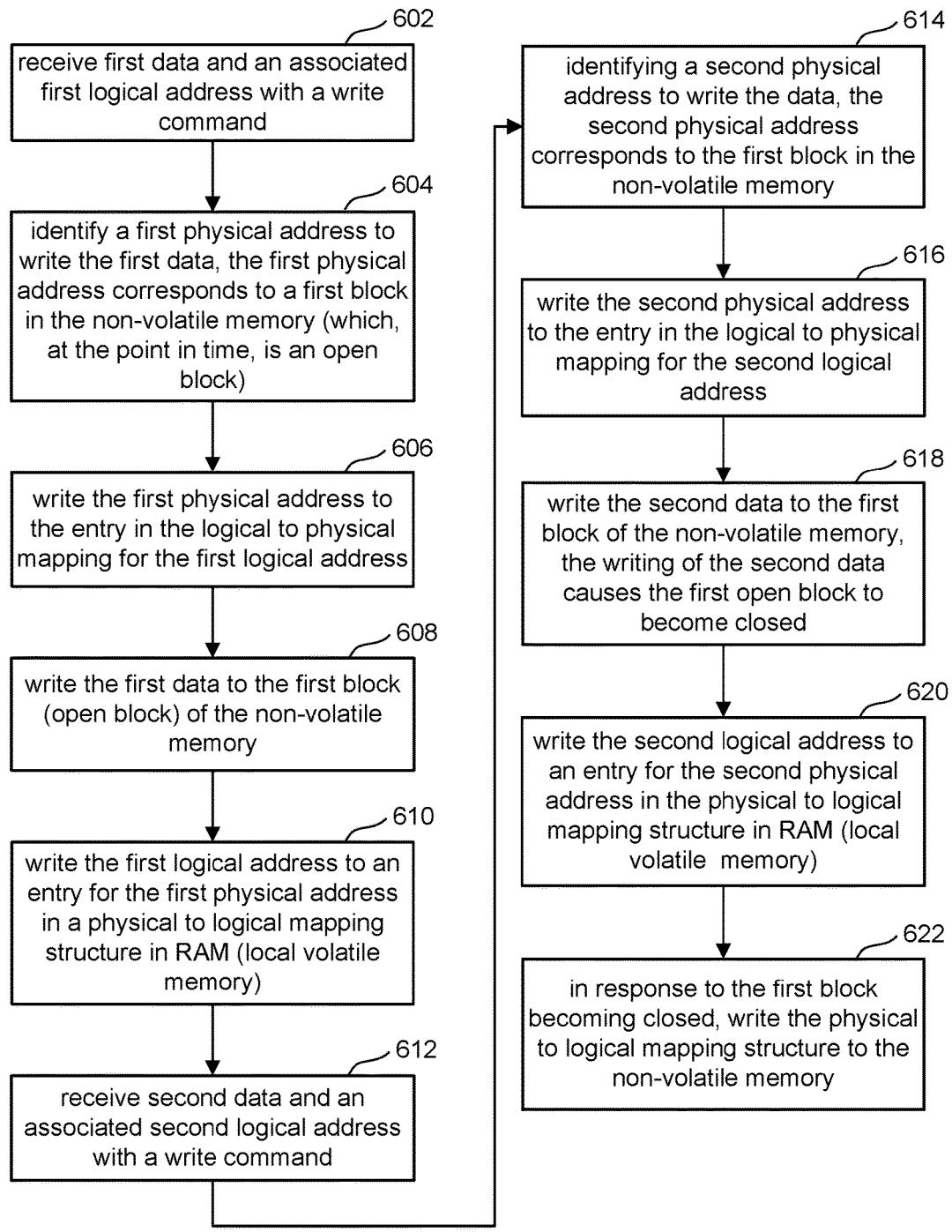
FIG. 9 is a flow chart describing one embodiment of a process for writing data.

As controller 22 continues to program data into block 502, P2L table 552 will remain in RAM 106. Once block 502 is closed, P2L table 552 will be written to non-volatile memory 24. This process is discussed in more detail by the flow chart of FIG. 9 and the block diagrams of FIGS. 8B-D. In one embodiment, the process of FIG. 9 is performed by controller 22 or another set of one or more processors in communication with the host and the non-volatile memory. In step 602 of FIG. 9, controller 22 receives first data and an associated first logical address with a write command from host 2 (or another device). For example purposes, FIG. 8A represents the state of block 502, L2P table 550 and P2L table 552 at the time of step 602. For example purposes, the first logical address is LA3. In step 604, controller 22 identifies a first physical address to write the first data. The first physical address corresponds to a first block in the non-volatile memory (which, at the point in time, is an open block). In this example, controller 22 intends to write the first data to page 534 of block 502; therefore, first physical address identified in step 602 is PA3, which corresponds to page 534 of block 502. In step 606, controller 22 writes the first physical address to the entry in the logical to physical mapping for the first logical address. In the example of FIGS. 8A-D, step 606 includes writing physical address PA3 into the entry in L2P table 550 for logical address LA3. In step 608, controller 22 writes the first data to the first block (open block) of the non-volatile memory. For example, the first data is written to page 534 of block 502 in non-volatile memory 24. In step 610, controller 22 writes the first logical address to an entry for the first physical address in a physical to logical mapping structure in RAM (local volatile memory). For example, logical address LA3 is written to the entry for physical address PA3 in P2L table 552 in RAM 106. FIG. 8B represents the state block 502, L2P table 550 and P2L table 552 after step 610. As can be seen, page 534 of block 502 is programmed (P). Logical address LA3 is stored in the entry for physical address PA3 in P2L table 552 in RAM 106. Physical address PA3 is stored in the entry of L2P table 550 for logical address LA3.

In step 612 of FIG. 9, controller 22 receives second data and an associated second logical address with a write command. For example purposes, the second logical address is LA4. In step 614, controller 22 identifies a second physical address to write the data, where the second physical address corresponds to the first block in the non-volatile memory. In the example of FIGS. 8A-D, step 614 includes controller 22 identifying page 536 and physical address PA4 for writing the second data. In step 616, controller 22 writes the second physical address to the entry in the logical to physical mapping for the second logical address. For example, controller 22 writes physical address PA4 into the entry for logical address LA4 in L2P table 550. In step 618, controller 22 writes the second data to the first block of the non-volatile memory. The writing of the second data causes the first open block to become closed. For example, controller programs the second data into page 536. In step 620, controller 22 writes the second logical address to an entry for the second physical address in the physical to logical mapping structure in RAM (local volatile memory). For example, controller 22 writes logical address LA4 into the entry in P2L table 552 for physical address LA4. FIG. 8C represents the state block 502, L2P table 550 and P2L table 552 after step 620. As can be seen, page 536 of block 502 is programmed (P) such that all of the pages of block 502 are programmed and, therefore, block 502 is now a closed block. Logical address LA4 is stored in the entry for physical address PA4 in P2L table 552 in RAM 106. Physical address PA4 is stored in the entry of L2P table 550 for logical address LA4.

In step 622, in response to the first block becoming closed, controller 22 writes the physical to logical mapping structure to the non-volatile memory. For example, in response to block 502 becoming closed, controller 22 writes P2L table 552 into non-volatile memory, as depicted by FIG. 8D. In some embodiments, the logical to physical mapping structure can also be written to the non-volatile memory at the same time (or a time shortly thereafter or before).

In an alternative embodiment, step 620 is performed after or at the same time as step 622 such that writing the second logical address to the entry for the second physical address in the physical to logical mapping structure is performed when the physical to logical mapping structure is being moved or is already moved to the non-volatile memory (so it is not written to the structure in RAM).

While the embodiment of FIG. 9 describes writing the P2L table to non-volatile memory at the end of writing a block (i.e. when the block becomes closed), in other embodiments, the P2L table can be written to non-volatile memory multiple times (including while the block is still being written to and/or is still an open block).

Figure 10:
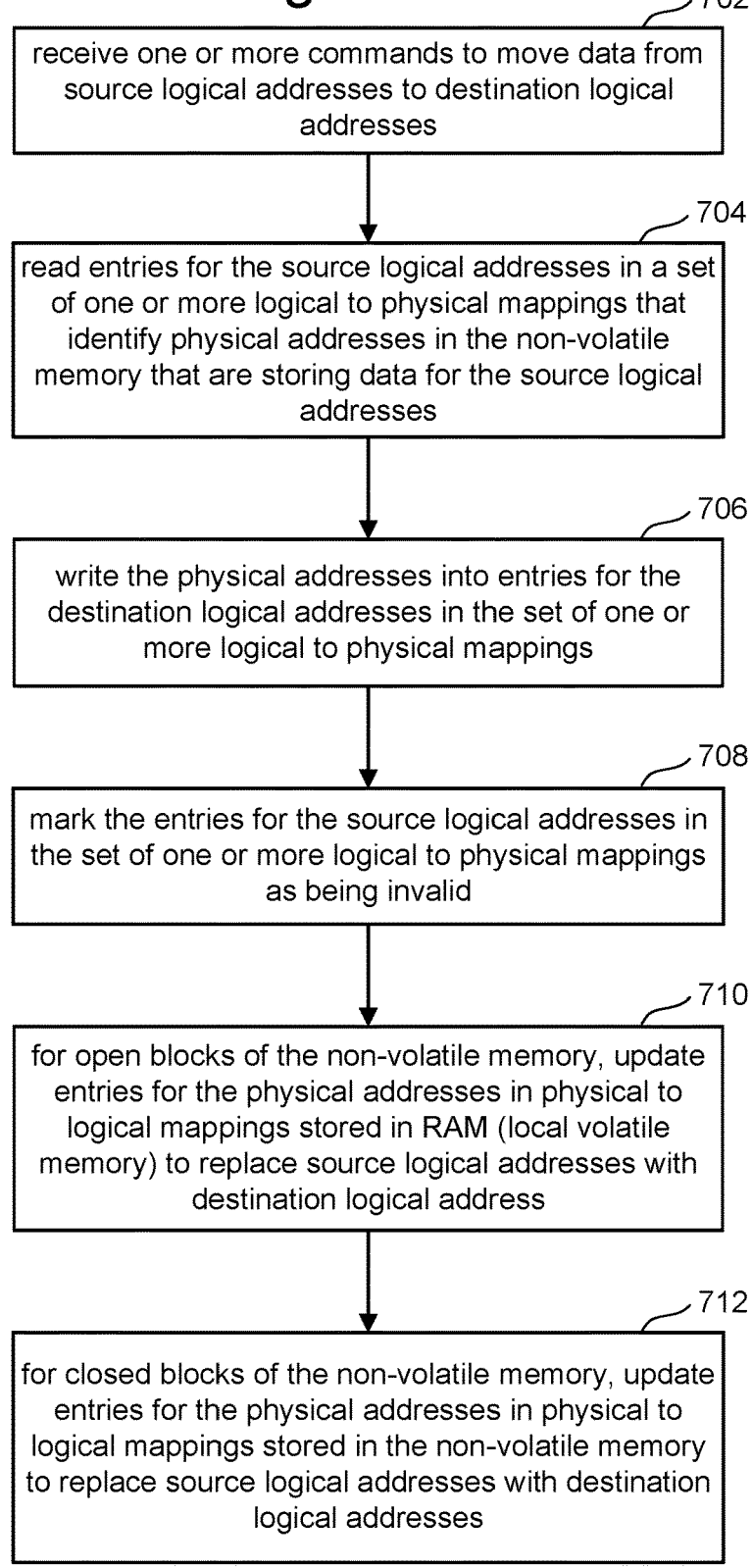
FIG. 10 is a flow chart describing one embodiment of a process for moving host data from a source logical address to a destination logical address without moving the host data between memory cells.

As discussed above, one approach to performing defragmentation of non-volatile memory system 24 is for host 2 to issue a defragmentation or move command. FIG. 10 is a flow chart describing one embodiment for a memory system performing a move command. In one embodiment, the process of FIG. 10 is performed by controller 22 (see FIGS. 1-3) or any of the one or more control circuits mentioned above (see FIGS. 1-4), which can include controller 22, and comprises moving the host data between logical addresses by updating logical to physical mappings, updating a physical to logical mapping that is stored in the memory cells if the host data is stored in a closed block and updating a physical to logical mapping that is stored in RAM if the host data is stored in an open block.

In step 702 of FIG. 10, the memory system receives one or more commands to move data from source logical addresses to destination logical addresses. For example, controller 22 receives one or more move commands from host 2. In response to the received one or more move commands, the memory system performs step 704-712.

Figure 11:
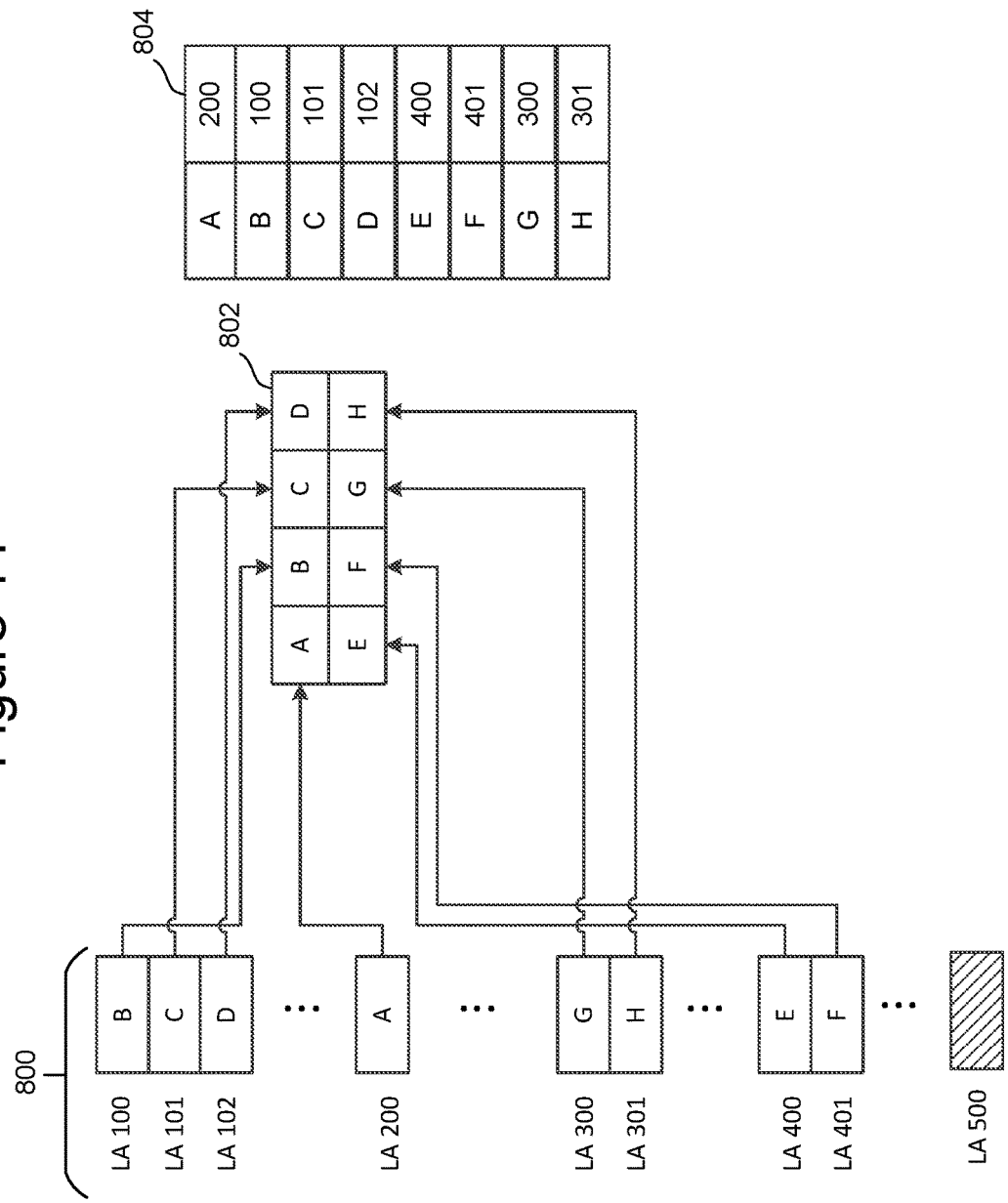
FIG. 11 is a block diagram that depicts logical to physical mappings, physical to logical mappings and a portion of a block of host data.
Figure 12:
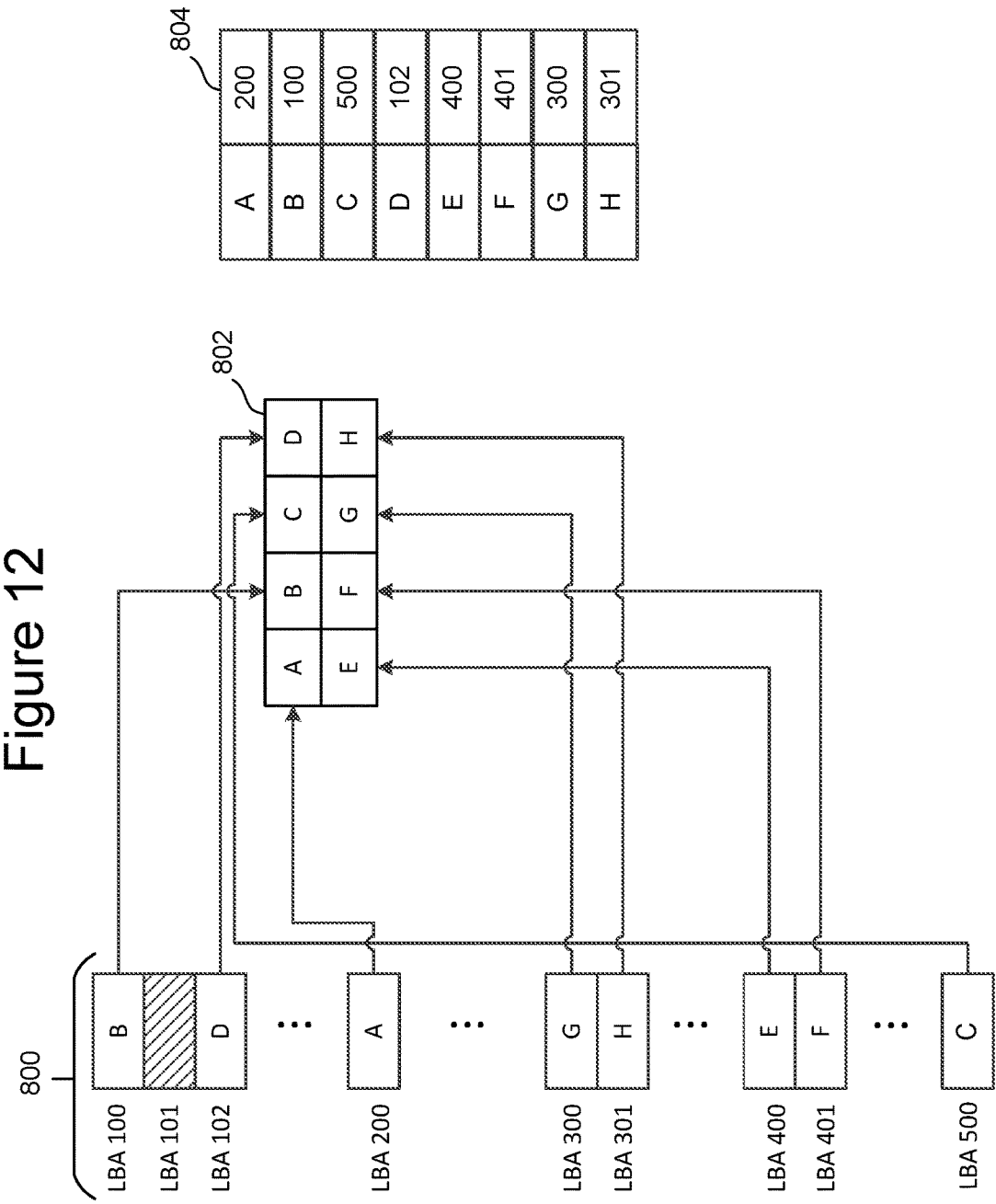
FIG. 12 is a block diagram that depicts logical to physical mappings, physical to logical mappings and a portion of a block of host data.

FIGS. 11 and 12 graphically depict the performance of the move command in step 704-712. For example, FIG. 11 shows logical to physical mappings 800 (which correspond to the L2P tables discussed above), host data 802 and physical to logical mappings 804 (which correspond to P2L tables discussed above). With respect to logical to physical mappings 800, FIG. 11 shows entries for logical addresses LA 100, LA 101, LA 102, LA 200, LS 300, LA 301, LS 400, LA 401 and LA 500. With respect to physical to logical mappings 804, FIG. 11 shows entries for physical addresses A, B, C, D, E, F, G and H. Host data 802 shows data for a portion of a block. In one embodiment, host data 802 depicted in FIG. 11 represents data for two word lines divided into eight pages (four pages per word line). In the box for each page of host data, FIG. 11 depicts the physical address (A-H) for that page. At the moment in time depicted by FIG. 11, the portion of the non-volatile memory labeled as host data 802 is storing data for logical addresses LA 100, LA 101, LA 102, LA 200, LS 300, LA 301, LS 400, and LA 401. The page addressed by physical address A is storing data for logical address LA 200. The page addressed by physical address B is storing data for logical address LA 100. The page addressed by physical address C is storing data for logical address LA 101. The page addressed by physical address D is storing data for logical address LA 102. The page addressed by physical address E is storing data for logical address LA 400. The page addressed by physical address F is storing data for logical address LA 401.

The page addressed by physical address G is storing data for logical address LA 300. The page addressed by physical address H is storing data for logical address LA 301. These mappings are reflected in logical to physical mappings 800 and physical to logical mappings 804. For example, the entry in logical to physical mappings 800 for logical address LA 100 stores physical address B, the entry in logical to physical mappings 800 for logical address LA 101 stores physical address C, the entry in logical to physical mappings 800 for logical address LA 102 stores physical address D, the entry in logical to physical mappings 800 for logical address LA 200 stores physical address A, the entry in logical to physical mappings 800 for logical address LA 300 stores physical address G, the entry in logical to physical mappings 800 for logical address LA 301 stores physical address H, the entry in logical to physical mappings 800 for logical address LA 400 stores physical address E, the entry in logical to physical mappings 800 for logical address LA 401 stores physical address F, and the entry in logical to physical mappings 800 for logical address LA 500 does not store a physical address. Analogously, the entry in physical to logical mappings 804 for physical address A stores logical address 200, the entry in physical to logical mappings 804 for physical address B stores logical address 100, the entry in physical to logical mappings 804 for physical address C stores logical address 101, the entry in physical to logical mappings 804 for physical address D stores logical address 102, the entry in physical to logical mappings 804 for physical address E stores logical address 400, the entry in physical to logical mappings 804 for physical address F stores logical address 401, the entry in physical to logical mappings 804 for physical address G stores logical address 300, and the entry in physical to logical mappings 804 for physical address H stores logical address 301. In one example, the command to move data received in step 702 requested that data be moved from logical address LA 101 to logical address LA 500.

In step 704, the memory system reads entries for the source logical addresses in a set of one or more logical to physical mappings that identify physical addresses in the non-volatile memory that are storing host data for the source logical addresses. In the current example, step 704 includes controller 22 reading the entry in logical to physical mappings 800 for logical address LA 101, which stores physical address C. In step 706, the memory system writes the physical addresses into entries for the destination logical addresses in the set of one or more logical to physical mappings. For example, the memory system writes the physical address C (read in step 704) into the entry in logical to physical mappings 800 for logical address LA 500. In step 708, the memory system marks the entries for the source logical addresses in the set of one or more logical to physical mappings as being invalid. For example, the memory system stores a data value representing invalid data in the entry in logical to physical mappings 800 for logical address LA 101. Steps 708 and 710 are examples of updating logical to physical mappings.

In step 710, for open blocks of the non-volatile memory, the memory system updates entries for the physical addresses in physical to logical mappings stored in RAM (local volatile memory) to replace source logical addresses with destination logical address. That is, if the blocks that are subjected to the move commands are open blocks, then the physical to logical mappings stored in RAM are updated. These mappings may also be written into the non-volatile memory. In one embodiment, step 710 always includes writing to non-volatile memory the physical to logical mappings that are stored in RAM (i.e. flushing the P2L table(s) by force). Therefore, in some implementations, the memory system (e.g., one or more control circuits) is configured to program into the memory cells the physical to logical mapping structure that is stored in the local volatile memory one or multiple times while the block is still an open block. In step 712, for closed blocks of the non-volatile memory, the memory system updates entries for the physical addresses in physical to logical mappings stored in the non-volatile memory to replace source logical addresses with destination logical addresses. That is, if the blocks that are subjected to the move commands are closed blocks, then the physical to logical mappings stored in non-volatile memory are updated. The physical to logical mappings stored in the non-volatile memory are stored separate from the host data and outside of headers for the host data (i.e. not in HDR of FIG. 7); for example, the physical to logical mappings can be stored in the memory cells as part of a set of management tables stored in separate blocks from the host data or the physical to logical mappings can be stored on a different word line than the relevant host data. In both steps 710 and 712, the appropriate physical to logical mappings are updated so that the entries for the physical addresses of the host data are changed from the source logical addresses to the destination logical addresses. For example, the entry for physical address C in physical to logical mappings 804 is updated from 101 to 500. Note that steps 704-712 comprise the performing of the one or more commands to move host data from the source logical addresses to the destination logical addresses without physically moving the host data between non-volatile memory cells.

FIG. 12 depicts the logical to physical mappings 800, host data 802 and physical to logical mappings 804 of FIG. 11 after performing steps 704-712. As can be seen, the entry for logical address LA 500 in logical to physical mappings 800 has been updated to store physical address C (see step 706). The entry for logical address LA 101 in logical to physical mappings 800 has been marked invalid, as depicted by the shading (see step 708). The entry for physical address C in physical to logical mappings 804 is updated to 500 (see steps 710 or 712). Thus, the process of FIG. 10 (as explained by FIGS. 11 and 12) describe how in response to the command to move host data from a source logical address to a destination logical address, the one or more control circuits are configured to update logical to physical mappings and update a physical to logical mapping that is stored in the memory cells separate from the host data without moving the host data between memory cells. In one example implementation, the one or more control circuits are configured to update a physical to logical mapping that is stored in the memory cells if the host data is stored in a closed block in the memory cells and update a physical to logical mapping that is stored in the local volatile memory if the host data is stored in an open block in the memory cells, without moving the host data between memory cells.

In one embodiment, step 712 includes updating entries for the physical addresses in physical to logical mappings stored in the non-volatile memory by re-writing the physical to logical mapping that is stored in the memory cells of the non-volatile memory to a new location in the memory cells. For example, the physical to logical mappings can be stored as part of the management tables 28 (see P2L of FIG. 1) in non-volatile memory 24 (see FIG. 1). One method to update the table is to re-write the table with any new data replacing old data. The table is read from a first location in the non-volatile memory, data is updated and then the updated table is programmed back into the non-volatile memory at a second location within the management tables 28 of non-volatile memory 24. In this embodiment, the physical to logical mapping (the P2L table) is stored separately from the corresponding host data.

In another embodiment, the physical to logical mappings (the P2L table) are stored in the same block as (or otherwise with) the corresponding host data. For example, the physical to logical mappings are stored on a different word line than the pages of host data. Consider an example where a block of memory cells has sixty four word lines. In that example, sixty three word lines can be used to store host data and one word line can be used to store the physical to logical mappings (the P2L tables). This scenario is depicted in FIGS. 13 and 14, which shows a block of memory 902 that includes word lines 904, 906, 908, . . . , 910, 912. Word lines 904, 906, 908, . . . , 910 are connected to memory cells that will store host data. Word line 910 stores data for pages 0, 1, 2 and 3. Word line 908 stores data for pages 240, 241, 242, and 243. Word line 906 stores data for pages 244, 245, 246, and 247. Word line 904 stores data for pages 248, 249, 250 and 251. Word line 912 is connected to memory cells that store physical to logical mappings (one or more P2L tables). In one example implementation, the physical to logical mappings will explicitly store pairs of data, where each pair includes a physical address (i.e., the key) that does not change and a logical address that can be any of multiple possible logical addresses. Thus, using the example above, the data stored in word line 912 may look something like: (A, 200), (B, 100), (C, 101), (D, 102), (E, 400), (F, 401), (G, 300), (H, 301). In a second alternative, the key is inferred, meaning that since the physical address in the P2L cannot change there is no reason to use space in the memory store it. Instead, the system stores the logical addresses of the P2L in the appropriate order. In this second alternative, the data stored in word line 912 may look something like: 200, 100, 101, 102, 400, 401, 300, 301 (using the data from the example of FIG. 11). Block 902 of FIG. 13, which would be stored in the non-volatile memory (see step 712 of FIG. 10), depicts the second alternative in that the memory cells connected to word line 912 will store the physical to logical mapping for block 502 as, for example, the data "200, 100, 101, 102, 400, 401, 300, 301 . . . "

Some of the memory cells connected to word line 912 of block 902 will be reserved to implement an update area 920 that stores updates to the physical to logical mappings. Because many non-volatile memory technologies, such as flash memory, require an entire block to be erased and re-written when changing data within the block, update area 920 is used to write changes to the physical to logical mapping without having to erase and rewrite the entire block. In one embodiment, update area 920 stores data in the form of (page #, new logical address), where the "new logical address" replaces the existing logical address for the physical address associated with the page number. Alternatively, the data stored in update area 920 can be in the form of (physical address, new logical address) where the "new logical address" replaces the existing logical address for the "physical address." In other embodiments, other indications of which logical address to replace can be used. Also, in other embodiments, the update area 920 can be in a different block.

FIG. 14 shows how the example move command from FIGS. 11 and 12 is implemented by updating the physical to logical mapping (which is stored in memory cells in the same physical block as the host data) by appending the new destination logical address to the physical to logical mappings stored in the non-volatile memory with an indication of which other logical address to replace without removing the other logical address. For example, FIG. 14 shows update area 920 storing the data (250, 500), indicating that 500 is the new logical address for page 250.

Figure 15A:
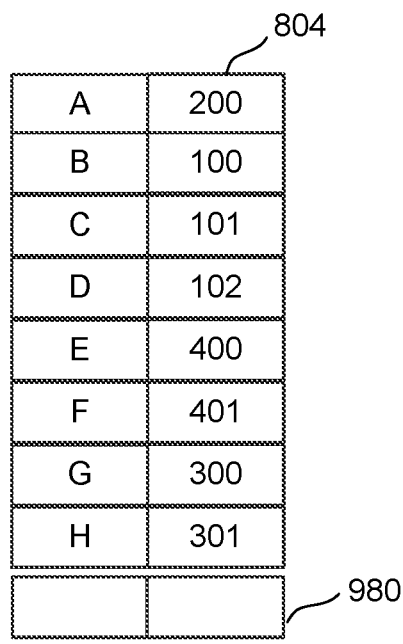
FIGS. 15A and 15B depict physical to logical mappings in the form of a P2L table that is part of a set of management tables stored in separate blocks from the host data.
Figure 15B:
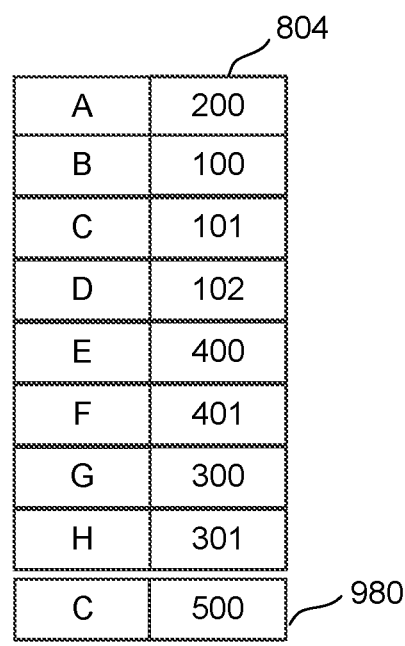

FIG. 14 shows appending the new destination logical address to the physical to logical mappings for a physical to logical mapping on a different word line, but same block, as the host data. FIGS. 15A and 15B describe appending the new destination logical address to the physical to logical mappings with an indication of which other logical address to replace without removing the other logical address for a physical to logical mapping that is stored in a different physical block than the host data. For example, FIG. 15A shows physical to logical mappings 804 of FIG. 11, with update area 980 that can store updates to the physical to logical mappings. FIG. 15B shows how the example move command from FIGS. 11 and 12 is implemented by updating the physical to logical mapping 804 (which, in this embodiment, is stored in memory cells is in a different physical block than the host data) by appending the new destination logical address to the physical to logical mappings stored in the non-volatile memory with an indication of which other logical address to replace without removing the other logical address. For example, FIG. 15B shows update area 980 storing the logical address 500 an entry for physical address C, indicating that 500 is the new logical address for physical address C.

The above-discussion describes a memory system that responds to a defragmentation or move command by updating management tables without moving data in the physical memory. This will lead to faster performance, less wear and use of less power.

One embodiment includes an apparatus comprising a memory structure comprising a plurality of non-volatile memory cells and one or more control circuits in communication with the memory structure. In response to a command to move host data from a source logical address to a destination logical address, the one or more control circuits are configured to update logical to physical mappings and update a physical to logical mapping that is stored in the memory cells separate from the host data without moving the host data between memory cells.

One embodiment includes a method of operating non-volatile memory, comprising: receiving one or more commands to move data from source logical addresses to destination logical addresses; reading entries for the source logical addresses in a set of one or more logical to physical mappings that identify physical addresses in the non-volatile memory that are storing data for the source logical addresses in response to the one or more commands; writing the physical addresses into entries for the destination logical addresses in the set of one or more logical to physical mappings; marking the entries for the source logical addresses in the set of one or more logical to physical mappings as being invalid; and updating entries for the physical addresses in physical to logical mappings stored in the non-volatile memory to replace source logical addresses with destination logical addresses, the physical to logical mappings stored in the non-volatile memory are stored outside of headers for the data. The writing the physical addresses, the marking the entries and the updating entries are performed without physically moving the data represented by the source logical addresses and the destination logical addresses.

One embodiment includes an apparatus comprising a host interface configured to communicate with a host, a memory interface configured to communicate with non-volatile memory, and one or more processors in communication with the host interface and the memory interface. The one or more processors are configured to address portions of the non-volatile memory via the memory interface using physical addresses. The one or more processors are also configured to address portions of host data via the host interface using logical addresses. The one or more processors configured to maintain logical to physical mappings and physical to logical mappings for the logical addresses and the physical addresses. The one or more processors are also configured to move data from a first logical address to a second logical address by updating logical to physical mappings and physical to logical mappings without instructing the non-volatile memory to move the data between physical locations.

One embodiment includes an apparatus comprising a plurality of non-volatile memory cells and means for moving host data from a source logical address to a destination logical address without moving the host data between memory cells by updating a logical to physical mapping and updating a physical to logical mapping that is stored in the memory cells separate from the host data.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus, comprising:
a local volatile memory;
a memory structure comprising a plurality of non-volatile memory cells; and
one or more control circuits in communication with the memory structure and the local volatile memory;
in response to a command to move host data from a source logical address to a destination logical address the one or more control circuits are configured to update a logical to physical mapping, update a physical to logical mapping that is stored in the memory cells if the host data is stored in a closed block in the memory cells and update a physical to logical mapping that is stored in the local volatile memory if the host data is stored in an open block in the memory cells, without moving the host data between memory cells.

2. The apparatus of claim 1, wherein:
the one or more control circuits are configured to read an entry for the source logical address in the logical to physical mappings that identify a physical address in the memory structure storing host data associated with the source logical address; and
the one or more control circuits are configured to update the logical to physical mappings by writing the physical address into an entry for the destination logical addresses in the logical to physical mappings and marking the entry for the source logical addresses in the logical to physical mappings as being invalid.

3. The apparatus of claim 1, wherein:
the one or more control circuits are configured to update the physical to logical mapping that is stored in the memory cells by appending the destination logical address to the physical to logical mappings stored in the non-volatile memory with an indication of which other logical address to replace without removing the other logical address.

4. The apparatus of claim 1, wherein:
the one or more control circuits are configured to update the physical to logical mapping that is stored in the memory cells by re-writing the physical to logical mapping that is stored in the memory cells to a new location in the memory cells.

5. The apparatus of claim 1, wherein:
the physical to logical mapping that is stored in the memory cells is part of a set of management tables stored in separate blocks from the host data.

6. The apparatus of claim 1, wherein:
the physical to logical mapping that is stored in the memory cells is stored on a different word line than the host data.

7. The apparatus of claim 1, wherein:
the one or more control circuits are configured to write first data to a first open block of the memory cells, the first data associated with a first logical address, the first open block associated with a first physical address; and
the one or more control circuits are configured to write the first logical address to an entry for the first physical address in the physical to logical mapping that is stored in the local volatile memory.

8. The apparatus of claim 7, wherein:
the one or more control circuits are configured to write second data to the first open block, the second data associated with a second logical address, the first open block associated with a second physical address, the writing of the second data causes the first open block to become closed; and
in response to the first open block becoming closed, the one or more control circuits are configured to program into the memory cells the physical to logical mapping structure that is stored in the local volatile memory.

9. The apparatus of claim 8, wherein:
the one or more control circuits are configured to program into the memory cells the physical to logical mapping structure that is stored in the local volatile memory multiple times while the first open block is still an open block.

10. The apparatus of claim 1, wherein:
the one or more control circuits comprise a controller that includes a host interface, a memory interface configured to communicate with the memory structure and one or more processors in communication with the host interface and the memory interface.

11. The apparatus of claim 10, wherein:
the controller is configured to address portions of the non-volatile memory via the memory interface using physical addresses, the controller is configured to address portions of host data via the host interface using logical addresses, the controller is configured to maintain logical to physical mappings and physical to logical mappings for the logical addresses and the physical addresses.

12. The apparatus of claim 11, wherein:
logical to physical mappings indicate translations from logical addresses in a logical address space to physical addresses of the memory cells, for entries in logical to physical mappings the logical addresses do not change while the physical addresses do change; and
the physical to logical mapping indicates, for a given physical address, what logical address has its data stored in that physical address, for entries in the physical to logical mapping the physical addresses do not change while the logical addresses do change.

13. A method of operating non-volatile memory, comprising:
receiving one or more commands to move data from source logical addresses to destination logical addresses;
reading entries for the source logical addresses in a set of one or more logical to physical mappings that identify physical addresses in the non-volatile memory that are storing data for the source logical addresses in response to the one or more commands;
writing the physical addresses into entries for the destination logical addresses in the set of one or more logical to physical mappings;
marking the entries for the source logical addresses in the set of one or more logical to physical mappings as being invalid; and
updating entries for the physical addresses in physical to logical mappings to replace source logical addresses with destination logical addresses by updating physical to logical mappings in Controller RAM for open blocks and rewriting physical to logical mappings in the non-volatile memory for closed blocks;
the writing the physical addresses, the marking the entries and the updating entries are performed without physically moving the data represented by the source logical addresses and the destination logical addresses.

14. The method of claim 13, wherein:
the updating entries for the physical addresses in physical to logical mappings stored in the non-volatile memory comprises adding a destination logical address to the physical to logical mappings stored in the non-volatile memory with an indication of which source logical address to replace without removing the source logical address.

15. The method of claim 13, wherein:
the updating entries for the physical addresses in physical to logical mappings stored in the non-volatile memory comprises re-writing the physical to logical mappings stored in the non-volatile memory with the destination logical addresses.

16. The method of claim 13, wherein:
the physical to logical mappings stored in the non-volatile memory are stored in different physical blocks than the data.

17. The method of claim 13, further comprising:
writing first data to a first open block of the non-volatile memory, the first data associated with a first logical address, the first open block associated with a first physical address; and
writing the first logical address to an entry for the first physical address in a first physical to logical mapping structure in RAM.

18. A method of operating a non-volatile memory system comprising a controller, RAM connected to the controller and non-volatile memory connected to the controller, the RAM is volatile memory, comprising:
receiving first data and a command to write the first data to a first logical address;
writing a first physical address to an entry for the first logical address in a logical to physical mapping structure;
writing the first data to the first physical address of a first open block of the non-volatile memory;
writing the first logical address to an entry for the first physical address in a physical to logical mapping structure stored in RAM;
receiving second data and a command to write the second data to a second logical address;
writing a second physical address to an entry for the second logical address in the logical to physical mapping structure;
writing the second data to the first open block at the second physical address, the writing of the second data causes the first open block to become closed;
writing the second logical address to an entry for the second physical address in the first physical to logical mapping structure;
in response to the first open block becoming closed, writing the first physical to logical mapping structure to the non-volatile memory;
receiving a command to move the second data from the second logical address to a third logical address; and
moving the second data from the second logical address to the third logical address without moving the second data between memory cells by updating the logical to physical mapping and updating the physical to logical mapping.

19. An apparatus, comprising:
a local volatile memory;
a host interface configured to communicate with a host;
a memory interface configured to communicate with non-volatile memory; and
one or more processors in communication with the local volatile memory as well as the host interface and the memory interface, the one or more processors configured to address portions of the non-volatile memory via the memory interface using physical addresses, the one or more processors configured to address portions of host data via the host interface using logical addresses, the one or more processors configured to maintain logical to physical mappings and physical to logical mappings for the logical addresses and the physical addresses, the one or more processors configured to move data from a first logical address to a second logical address by updating logical to physical mappings and physical to logical mappings without instructing the non-volatile memory to move the data between physical locations, the one or more processors are configured to update physical to logical mappings by updating entries in physical to logical mappings stored in the local volatile memory for open blocks of the non-volatile memory and updating entries in physical to logical mappings stored in the non-volatile memory via the memory interface for closed blocks of the non-volatile memory.

\* \* \* \* \*